Jan. 10, 1928.
E. N. VELLA
1,655,978
BUMPER FOR VEHICLES
Filed April 7, 1927
3 Sheets-Sheet 1
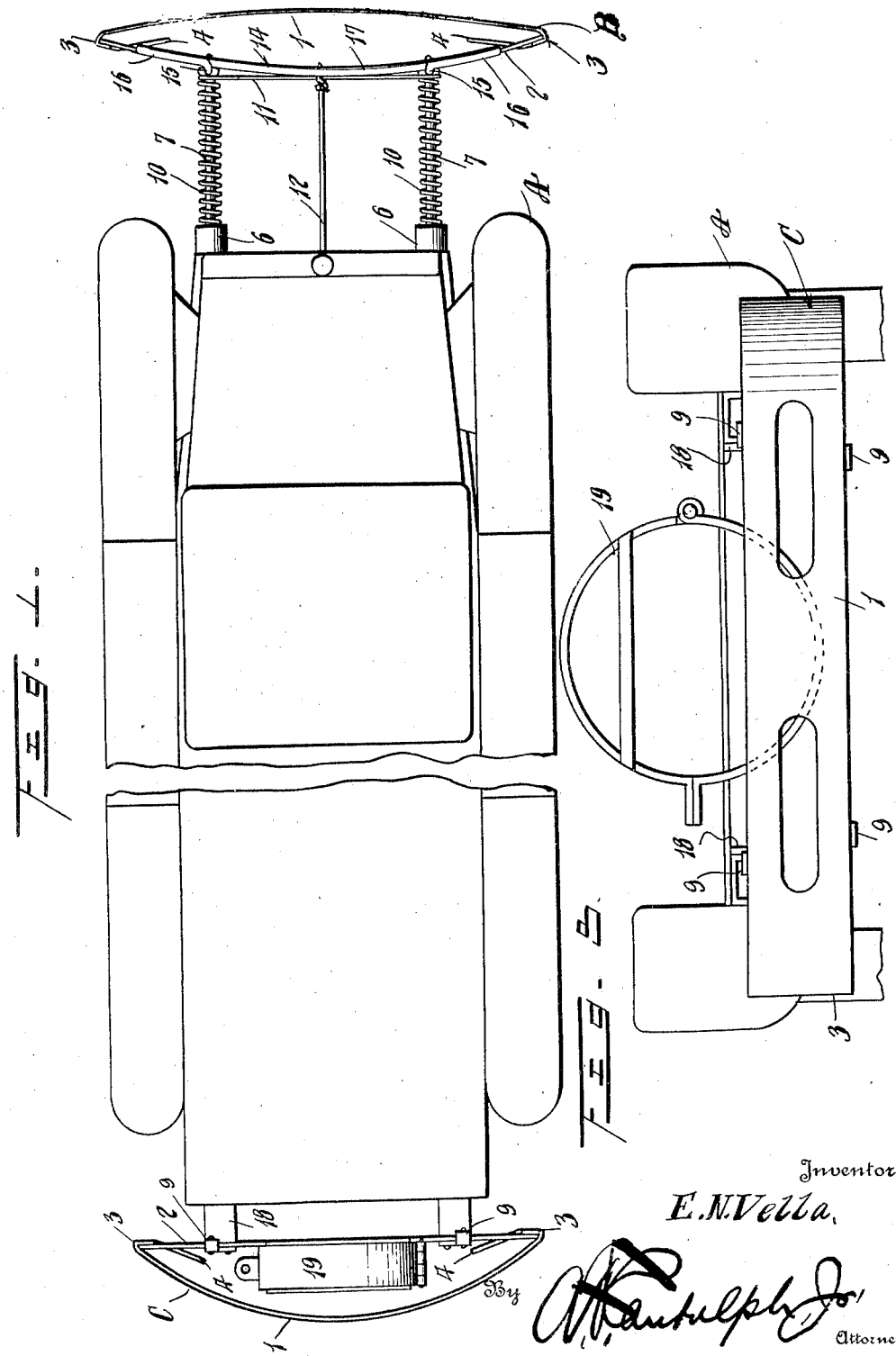

Jan. 10, 1928.
E. N. VELLA
1,655,978
BUMPER FOR VEHICLES
Filed April 7, 1927
3 Sheets-Sheet 2
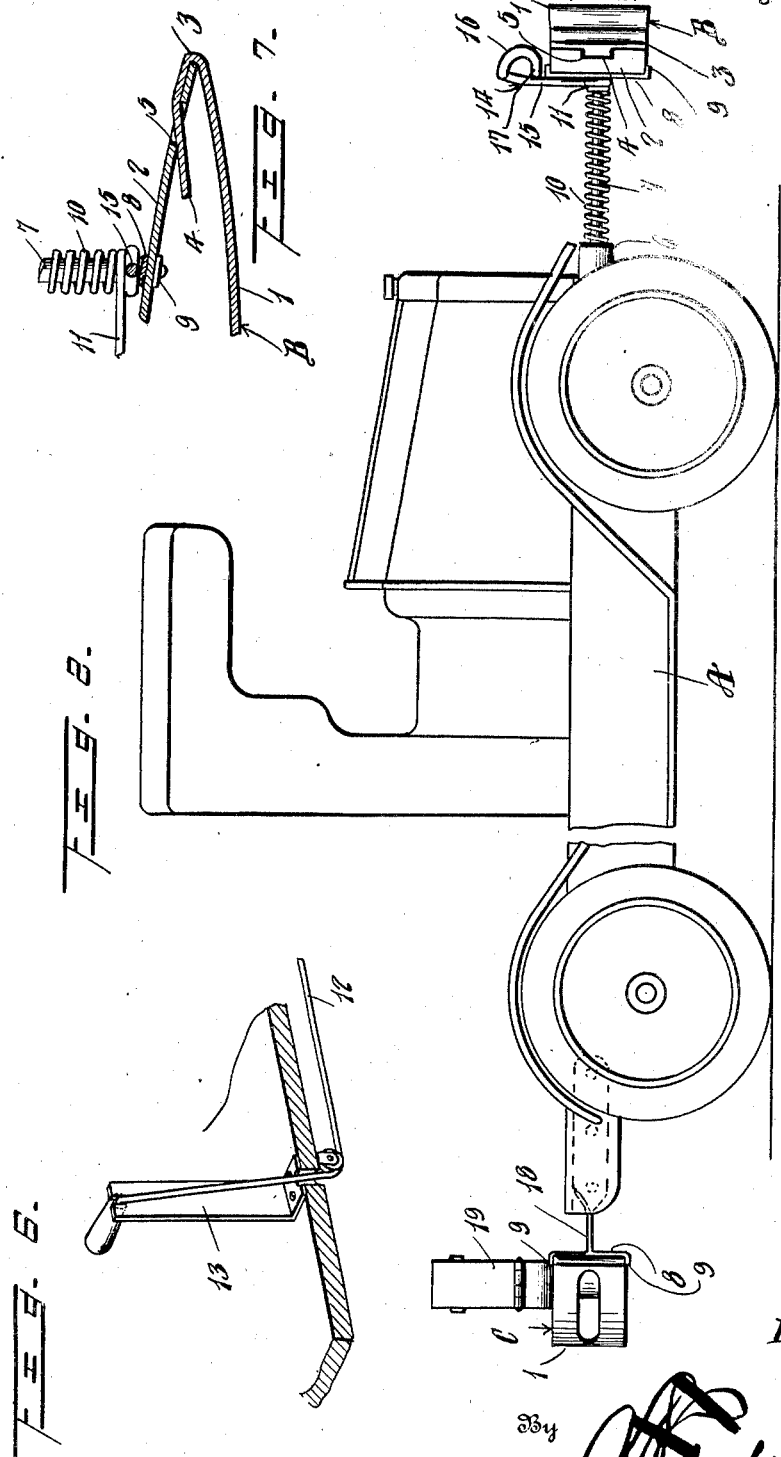
Inventor
E. N. Vella,
By
Attorney

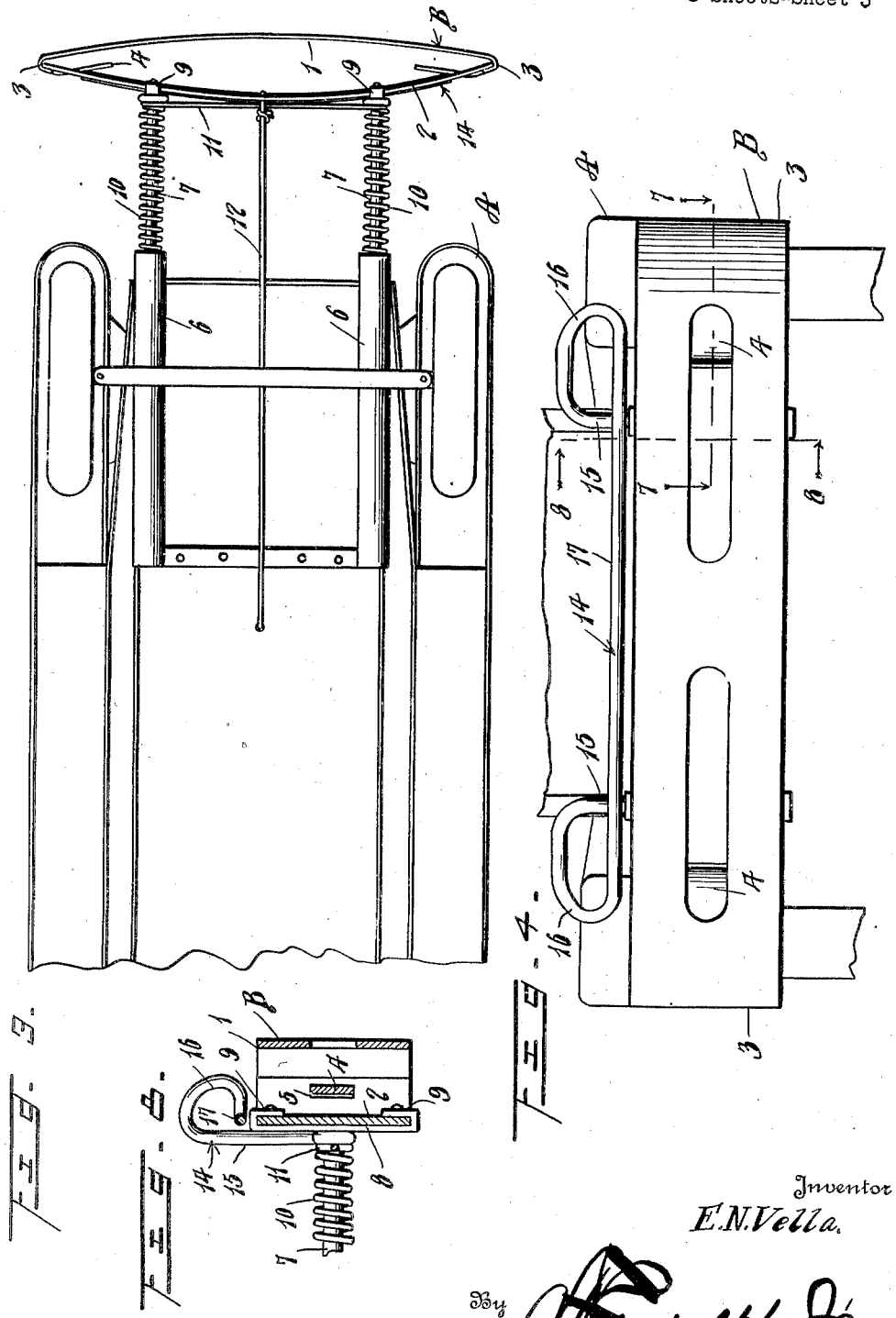

Patented Jan. 10, 1928.

1,655,978

UNITED STATES PATENT OFFICE.

EMANUEL N. VELLA, OF DETROIT, MICHIGAN.

BUMPER FOR VEHICLES.

Application filed April 7, 1927. Serial No. 181,786.

The invention relates to bumpers for vehicles such for instance as automobiles, trucks, street cars, and the like, and has for one of its objects the provision of an improved construction of bumper comprising a pair of plates of spring metal, the plates being bowed away from one another, and having their ends slidably engaging one another to permit relative movement of the two plates.

A further object of the invention is the provision of mountings for vehicle bumpers comprising rods to which the impact member of the bumper is secured, said rods being mounted to slide and spring means are used in connection therewith to propel the impact member forwardly when said spring means are released, and thus add the cushioning effect of said spring means to the spring bumper to sustain the impact of a collision; means being also provided under the control of an occupant of the vehicle to restrain the impact member and hold it in proximity to the front of the vehicle, under normal conditions.

The invention will be described in detail hereinafter and will be found illustrated in the accompanying drawings in which Figure 1 is a plan view showing the two ends of a motor vehicle with the improved construction of bumper mounted in the front and the rear thereof, Figure 2 is a side view of the vehicle with the bumpers in place, Figure 3 is a bottom plan view of the front portion of the vehicle showing the front bumper in position, Figure 4 is a front view of the vehicle disclosing the bumper in place, Figure 5 is a rear view of the vehicle showing the rear bumper in elevation, Figure 6 is a view of the means for restraining the front bumper against the action of the spring, Figures 7 and 8 are sectional detail views on planes indicated by the lines 7—7 and 8—8, respectively in Figure 4.

In the drawings similar reference characters will be used to designate corresponding parts throughout the several views.

As disclosed in the drawings the bumpers are shown in connection with an auto truck, but obviously any other vehicle may be protected by the bumpers, the drawings being for illustration only and do not limit the application of the bumpers. The truck is designated A, and the front bumper is designated B and the rear bumper is designated C. The construction of the impact members of the bumpers B and C are identical and the same reference characters will be used in designating the different parts of these bumpers as follows: Each of these bumpers is formed of two plates made of spring steel or other suitable spring material, the outer plate being designated 1, while the inner plate is designated 2. The outer plate 1 has its ends returned as shown at 3, and provided with tongues 4 that slidably engage in openings 5 in the rear plate 2. The two plates 1 and 2 are formed bowed away from one another, and it will be understood that this structure forms a cushion to counteract the effect of the bumper striking an object to relieve the vehicle to a large extent of shock incident thereto.

The means for mounting the front bumper B to the vehicle comprises tubular guides 6 secured under the chassis of the vehicle in which are slidably mounted rods 7 having their front ends provided with laterally extending arms 8 with inturned hooks 9 to engage over and under the inner plate 2 in the front bumper B and to be secured thereto in any suitable manner such for instance as by rivets, bolts or the like. An expansible coil spring 10 encloses each of the rods 7 which springs are terminally engaged by the tubular guides 6 and the arms 8, and normally function to move the impact member of the bumper B forwardly. Cross rod 11 connects the front ends of the rods 7, and has a flexible member 12 secured thereto and extending rearwardly and up through the floor of the vehicle, and provided with a knob or other projection on the end within the vehicle that engages a notched plate 13 in the driver's compartment of the vehicle by which the bumper B is retracted into near proximity to the front of the vehicle, said retraction being accomplished by pulling on the flexible member 12, and is held in retracted position by engaging the notch in the plate 13. A reinforcing member 14 is carried by the front ends of rods 7 and comprises a rod of suitable metal such for instance as spring steel, said rod being secured as stated to the front ends of the rods 7 and thus having upstanding portions 15, outwardly and downwardly curved portions 16, and an integral cross member connecting the outwardly and downwardly extending portions, and designated 17, said cross member 17 being preferably bowed rearwardly so that its rearmost portion is substantially alined with the inner plate 2 of the impact or bumper member B. This reinforcing member, it will be apparent, serves to reinforce the action of the impact member or bumper B should the vehicle strike an immovable object to prevent material damage to the impact member, and also the outwardly and downwardly extended portions 16 form horns or projections to catch a pedestrian that may be struck by the bumper and be thrown thereover to prevent throwing the pedestrian under the wheels of the vehicle, and also give him something to which he may hold to help himself from being seriously injured.

The rear bumper C is secured to the rear portion of the vehicle by means of arms 18 that engage the inner plate 2 of said bumper, and secured to said plate 2 between the plates 1 and 2, is a tire carrier of any approved form, and designated 19, it being apparent that this structure lends itself to an economical arrangement of the bumper and tire carrier, and at the same time the tire carrier serves as a reinforcement for the bumper C to prevent serious injury thereto when engaging a stationary object in back of the vehicle, or when struck by a vehicle coming from the rear.

In use the front bumper B will be held in retracted position with the rods 7 withdrawn and held in said position by securing member 12 in the notched plate 13 as indicated in Figure 6. In this position the bumper B will function as a bumper to protect the front fender and other parts of the vehicle. In event a collision is imminent, the member 12 may be released from engagement with the plate 13. The springs 10 will then react to move the bumper B into the position shown in Figures 1, 2, and 3, and thus add the cushioning effect of the springs 10 to the cushioning effect of the bumper itself to absorb the shock of the collision.

What is claimed is:—

1. A bumper for vehicles, comprising spring plates, one of said plates having its ends returned, tongues on said returned ends and engaging openings in the other plate, said plates being bowed outwardly from one another, and means to attach one of said plates to a vehicle.

2. A bumper for vehicles, comprising rods slidably mounted, an impact member secured to said rods, spring means to normally project the impact member, and manually releasable means to normally hold the impact member retracted.

3. A bumper for vehicles, comprising tubular guide members adapted to be secured to a vehicle, rods slidably mounted in said guide members, an impact member carried by said rods, expansible coil springs enclosing said rods and terminally engaged to normally project the impact member from the vehicle, and manually releasable means to normally hold the impact member retracted.

4. A bumper for vehicles, comprising tubular guide members adapted to be secured to a vehicle, rods slidably mounted in said guides, laterally extended arms on said rods, an impact member engaging said arms, expansible coil springs enclosing the rods and terminally engaged to normally project the impact member from the vehicle, and a flexible member suitably secured and manually actuated to retract the impact member, and means to engage the flexible member to hold the impact member retracted.

5. A bumper for vehicles, comprising tubular guide members adapted to be secured to a vehicle, rods slidably mounted in said guide members, an impact member carried by said rods, a reinforcing member carried by said rods and adjacent to the impact member to reinforce the operation of the impact member, expansible coil springs enclosing the rods and terminally engaged to normally project the impact member from the vehicle, and a flexible member suitably secured and manually actuated to retract the impact member, and means to engage the flexible member to hold the impact member retracted.

In testimony whereof I affix my signature.

EMANUEL N. VELLA.